Patented June 12, 1951

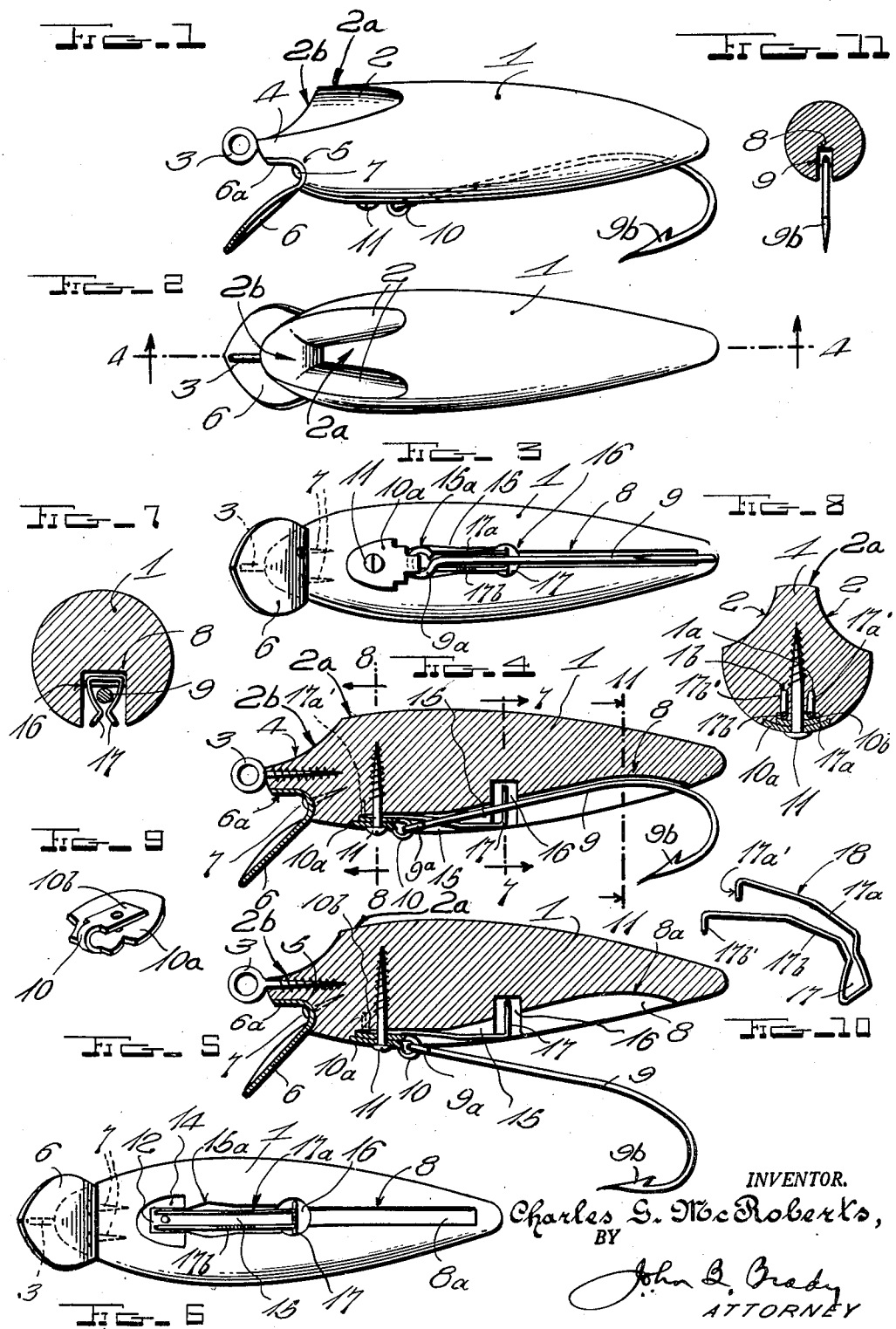

2,556,205

UNITED STATES PATENT OFFICE 2,556,205

ARTIFICIAL BAIT AND LURE

Charles G. McRoberts, Brooklyn, N. Y.

Application June 18, 1946, Serial No. 677,627

6 Claims. (Cl. 43—42.04)

My invention relates broadly to artificial bait and lures for use in fishing, and more particularly to an improved construction of artificial bait and lure which may be inexpensively manufactured on a mass production scale for efficient use in fishing.

One of the objects of my invention is to provide a simplified construction of artificial bait and lure having means for facilitating the catching of fish on strikes in which the fishhook is arranged to move from a controlled position in which a substantial portion of the shank extends within the artificial bait to a position external to the artificial bait in completing a strike.

Another object of my invention is to provide a construction of spring means disposed internally of an artificial bait structure for yieldably securing a swingable hook in position with a substantial portion of the shank releasably confined within the artificial bait preparatory to a strike.

Still another object of my invention is to provide a construction of spring element securing means for swingable fishhooks associated with artificial bait and lures which may be readily attached to the plug portion of the artificial bait or lure.

Still another object of my invention is to provide a construction of a longitudinally grooved plug for artificial bait and lure within which a substantial portion of the shank portion of a swingable fishhook may be normally housed within the plug and resiliently retained therein and ready for yieldable disengagement at the time of a catch for effecting a swinging operation to a position of strike.

Other and further objects of my invention reside in an improved construction of artificial bait and lure as set forth more fully in the specification hereinafter following by reference to the accompanying drawing, in which:

Figure 1 is a side elevational view of the artificial bait and lure of my invention showing the swingable fish hook in position with respect to the plug of the artificial bait and lure; Fig. 2 is a top plan view of the artificial bait and lure shown in Fig. 1; Fig. 3 is a bottom plan view of the artificial bait and lure and illustrating the swingable hook retained in position; Fig. 4 is a longitudinal sectional view through the artificial bait and lure and illustrating the manner of yieldably retaining the swingable hook in position within the plug preparatory to a strike; Fig. 5 is a longitudinal cross sectional view corresponding to the view illustrated in Fig. 4 but showing the swingable hook disengaged from the retaining means within the plug preparatory to movement in an arc to a position of strike; Fig. 6 is a bottom plan view of the plug showing the longitudinally extending slot therein and a retaining spring for normally securing the swingable hook in position with relation to the plug; Fig. 7 is a transverse sectional view taken substantially on line 7—7 of Fig. 4; Fig. 8 is a transverse sectional view taken substantially on line 8—8 of Fig. 4; Fig. 9 is a perspective view of the spring element securing means employed for attaching the swingable hook to the plug; Fig. 10 is a perspective view of the spring means employed for yieldably retaining the swingable hook in relation to the plug; and Fig. 11 is a transverse sectional view taken substantially on line 11—11 of Fig. 4 showing the swingable hook yieldably retained in relation to the plug.

Referring to the drawing in detail, reference character 1 designates the stream-lined body or plug of the artificial bait of wood, plastic or other material, which is symmetrically recessed at each side of the front end thereof to provide stabilizing surfaces represented at 2. The stabilizing surfaces 2 are spaced from each other by the surface portion 2a of the body or plug 1 and stream-lined into the intermediate deflecting surface 2b. A connection member 3 is provided in the terminus end 4 of the plug 1. Immediately adjacent the terminus end 4 of plug 1, I provide a transversely extending groove 5 on the side of the plug which is opposite the side containing the recessed surfaces 2. The groove 5 is substantially U-shaped and provides a seat for receiving the spoon 6 of shaped plastic or metallic material.

The spoon 6 is provided with a substantially U-shaped end portion represented at 6a which conforms in contour to the shape of the transversely extending groove 5 in the body portion 1 of the plug. The U-shaped end portion 6a of the spoon 6 is provided with spaced apertures through which securing means such as screws 7 extend into the body portion of the plug 1 for maintaining the spoon 6 in a position extending in a plane substantially at an acute angle to the longitudinal axis of the plug 1. The U-shaped end 6a of the spoon 6 when secured in the transverse groove 5 is solidly held and prevented from displacement, insuring the control of the position of plug 1.

The streamlined plug 1 is longitudinally slotted as represented at 8 to a substantial depth sufficient to house a substantial portion of the shank of the swingable hook 9 in position within the plug 1, with the hook 9 restrained upon its pivot by the engagement of eyelet 9a with the strap 10. The strap 10 is shown more particularly in perspective view in Fig. 9 constituted of an approximately semi-circular plate 10a on one end of strap 10 and a strip-like tongue 10b on the other end of strap 10. The portions 10a and 10b are adapted to be superimposed, one with respect to the other, and confined by means of securing screw 11 which passes through the apertures in each of the portions 10a and 10b and is secured in the body portion of the plug 1. The plug 1 is recessed as represented at 12 and 14 to receive the shaped ends 10b and 10a, respectively, of the strap 10 so that the securing portions of the strap are substantially streamlined within the shaped body or plug 1. The recessed portion 12 of the plug 1 continues with the slot 8 therein with a recessed interconnection 15 in the plug 1 extending therebetween. The recessed interconnection 15 is enlarged at 15a to permit the entry of eyelet 9a of hook 9 when the hook 9 is retained in position with respect to plug 1. Intermediate the slot 15 and the slot 8 I provide a bore or countersunk portion 16 extending radially into the body of the plug 1 as shown more particularly in Fig. 7 and forming a socket into which the engaging clamping portion 17 of spring 18 extends.

The spring 18 is shown more clearly in Fig. 10 and comprises a resilient wire device which is looped upon itself to provide a pair of spaced substantially parallel extending arms 17a and 17b extending from the clamping portion 17. The ends of the arms 17a and 17b are bent at approximately right angles thereto as represented at 17a' and 17b' and which project into sockets 1a and 1b in the plug 1. Thus the ends 17a' and 17b' of the arms 17a and 17b of spring device 18 may be anchored within the plug or body 1. The ends of the spring device are then clamped in position by the superimposed ends 10b and 10a of the strap 10 through which securing screw 11 passes. The spring device 18 is so shaped that the substantially parallel extending arms 17a and 17b approach the surface of the plug 1 within the slot 15 and extend in a position approximately tangent thereto.

The substantially parallel extending arms 17a and 17b are maintained wholly within the stream-lined contour of the plug 1 and are ready at all times to grip and resiliently maintain a substantial portion of the shank of hook 9 in stream-lined position within the body structure of the plug 1, as shown, for example, in Figs. 1 and 4. The swingable hook 9 has a contour which conforms with the curved contour 8a at the bottom of slot 8, thereby permitting the housing of a substantial portion of the shank of the swingable hook 9 in stream-lined relation to the body of plug 1. The swingable hook 9 terminates in the barbed hook point 9b which is curved outwardly from the stream-lined body of the plug 1 and is ready at all times for snaring a fish. The barbed hook point 9b of the fishhook 9 is exposed for the strike. When the fish bites the hook, the weight of the fish tends to swing free from the engaged position within the plug 1 around the swivel constituted by eyelet 9a and strap 10, enabling a strike to be made. The hook 9 is then free to swing pivotally about the strap 10 as the fish is played on the single hook. The single hook bites deeper and holds firmer than various forms of multiple hooks heretofore employed.

While in stowed position, a substantial portion of the shank of the hook is retained within the plug and the shank of the hook is instantly ready to be resiliently disengaged from the spring within the body of the plug for enabling the hook to swing to striking position.

The spaced stabilizing surfaces 2, and the connected surfaces 2a and 2b all coact with the surface of spoon 6 to control the path of movement of the stream-lined body 1 through the water in a substantially sinusoidal or a wabbling or zigzag course intended to attract the fish. This motion simulates life-like minnow action in the water to provide an enticement to the fish. Surfaces 2 and 2b operate as three deflecting surfaces in conjunction with the deflecting surface 6 of the spoon in controlling or establishing the path of movement of the stream-lined body 1.

I have found the structure of my invention very simple in manufacture, production, and operation, and while I have described my invention in one of its preferred embodiments, I desire that it be understood that modifications may be made and I intend no limitations upon my invention other than may be imposed by the scope of the appended claims.

What I claim as new and desire to secure by Letters Patent of the United States is as follows:

1. An artificial bait or lure comprising a stream-lined slotted body having a line-attaching means on one end, a hook pivoting means carried by said body, a swingable fishhook pivotally connected with said hook-pivoting means and normally having a substantial portion of its shank extending through said slotted body portion, and means fastened to said hook pivoting means and projecting into said slotted body for resiliently maintaining a substantial portion of the shank of said swingable hook in position within said slotted body preparatory to a strike.

2. An artificial bait or lure comprising a stream-lined slotted body having a line-attaching means on one end, a hook pivoting means carried by said body, a swingable fishhook pivotally connected with said hook-pivoting means and normally having a substantial portion of its shank within said slotted body, and spring means fastened to said hook pivoting means and projecting into said slotted body for yieldably engaging and maintaining a substantial portion of the shank of said swingable hook in position within said slotted body preparatory to a strike.

3. An artificial bait or lure comprising a stream-lined body having a longitudinally extending slot therein and having a line-attaching means on one end, a hook pivoting means carried by said body, a swingable fishhook pivotally connected with said hook-pivoting means and normally having a substantial portion of its shank housed within the longitudinally extending slot in said stream-lined body, and a wire element looped upon itself and having a pair of spaced substantially parallel extending side members extending longitudinally of the slot in the stream-lined body, said wire element being fastened at one end by said hook pivoting means operative at the other end to yieldably grip opposite sides of said swingable hook within said slotted body for maintaining a substantial portion of the shank of said swingable hook in position within said slotted body preparatory to a strike.

4. An artificial bait or lure comprising a stream-lined slotted body having a line-attaching means on one end, a hook holding and pivoting means carried by said body, a swingable fishhook pivotally connected with said hook holding and pivoting means and normally having a substantial portion of its shank housed within said slotted body, said slotted body having a recess therein approximately midway thereof, and a yieldable spring member having a pair of coacting latching portions projecting into the recess in said slotted body and secured at one end to the hook holding and pivoting means, and having a pair of yieldable arms projecting substantially parallel through said slotted body, said coacting latching portions of said yieldable spring member operating to yieldably engage opposite sides of the shank of said swingable hook for maintaining a substantial portion of the shank of said swingable hook in position within said slotted body preparatory to a strike.

5. An artificial bait or lure comprising a stream-lined slotted body having a line-attaching means on one end, a hook pivoting means carried by said body, a swingable fishhook pivotally connected with said hook-pivoting means and normally having a substantial portion of its shank housed within said slotted body, and a spring member comprising a wire element having a bend therein and extending through said slotted body with the ends thereof secured in said slotted body beneath said hook pivoting means, said spring member having a pair of coacting latch portions within said slotted body for engaging the shank of said swingable hook for detachably maintaining a substantial portion of the shank of said swingable hook within said slotted body preparatory to a strike.

6. An artificial bait or lure comprising a stream-lined slotted and recessed body having a line-attaching means on one end, a hook pivoting means carried by said body, a swingable fishhook pivotally connected with said hook-pivoting means and normally having a substantial portion of its shank housed within said slotted and recessed body, said hook-pivoting means being mounted within said recessed body, and a spring member secured at one end between said hook-pivoting means and said body and extending longitudinally through said slotted body and terminating in a latching means, whereby, the shank portion of said swingable hook is normally engaged by said latching means and a substantial portion of said swingable hook maintained within said slotted body preparatory to a strike.

CHARLES G. McROBERTS.

REFERENCES CITED

The following references are of record in the file of this patent:

UNITED STATES PATENTS

| Number | Name | Date |
|---|---|---|
| 935,657 | Howe | Oct. 5, 1909 |
| 1,246,162 | Ross | Nov. 13, 1917 |
| 1,365,813 | Brown | Jan. 18, 1921 |
| 2,001,652 | Bird | May 14, 1935 |
| 2,011,075 | Pflueger | Aug. 13, 1935 |
| 2,165,071 | Saaela | July 4, 1939 |
| 2,270,070 | McArthur | Jan. 13, 1942 |
| 2,325,107 | Burns | July 27, 1943 |